United States Patent [19]

White, Jr.

[11] Patent Number: 4,650,575

[45] Date of Patent: Mar. 17, 1987

[54] SORBING APPARATUS

[75] Inventor: Donald H. White, Jr., Homer, N.Y.

[73] Assignee: Pall Corporation, Glen Cove, N.Y.

[21] Appl. No.: 751,683

[22] Filed: Jul. 3, 1985

[51] Int. Cl.[4] .................... B01D 15/02; B01D 53/06
[52] U.S. Cl. ................................. 210/183; 210/403; 210/404; 210/502.1; 210/400; 55/267; 55/387; 62/271
[58] Field of Search ............... 210/671, 267, 180, 183, 210/184, 400, 496, 502.1, 402–404; 55/32–34, 68, 74, 77, 96, 267–269, 387, 390; 62/94, 271

[56] References Cited

U.S. PATENT DOCUMENTS

| | | |
|---|---|---|
| 1,322,804 | 11/1919 | MacFadden . |
| 2,881,127 | 4/1959 | Hetzel ............................ 210/671 X |
| 2,957,321 | 10/1960 | Munters et al. ........................ 62/271 |
| 3,069,830 | 12/1962 | Skarstrom et al. ...................... 55/58 |
| 3,144,901 | 8/1964 | Meek ........................................ 165/6 |
| 3,381,453 | 5/1968 | Dills ....................................... 55/208 |
| 3,401,530 | 9/1968 | Meckler .................................... 62/2 |
| 3,490,201 | 1/1970 | Colvin et al. ............................ 55/31 |
| 3,498,026 | 3/1970 | Messinger et al. ....................... 55/73 |
| 3,619,987 | 11/1971 | Colvin et al. .......................... 55/196 |
| 3,883,326 | 5/1975 | Wenner .................................. 55/34 |
| 4,046,525 | 9/1977 | Matsuo et al. ........................... 55/59 |
| 4,060,913 | 12/1977 | Yoshida et al. .......................... 34/80 |
| 4,062,129 | 12/1977 | Yoshida et al. .......................... 34/80 |
| 4,083,778 | 4/1978 | McGrew ............................... 210/671 |
| 4,135,943 | 1/1979 | Morishita et al. .................... 106/209 |
| 4,176,523 | 12/1979 | Rousseau ................................ 62/2 |
| 4,231,768 | 11/1980 | Seibert et al. .......................... 55/179 |
| 4,259,092 | 3/1981 | Matsuo et al. ........................... 55/78 |
| 4,259,096 | 3/1981 | Nakamura et al. ................... 55/316 |
| 4,341,637 | 7/1982 | Smith ............................... 210/671 X |
| 4,409,006 | 10/1983 | Mattia ..................................... 55/28 |
| 4,415,342 | 11/1983 | Foss ........................................ 55/96 |
| 4,452,612 | 6/1984 | Mattia ..................................... 55/25 |
| 4,529,496 | 7/1985 | Kruyer ............................ 210/671 X |

FOREIGN PATENT DOCUMENTS 1591242 6/1981 United Kingdom .

OTHER PUBLICATIONS

"Fritted Activated Carbon and the Removal of Pyrogens", Reinhardt, Universal Porosics, Incorporated, Nov. 1981.
"Characteristics of Toyobo Activated Carbon Fiber . . . ", Toyobo Co., Ltd. Mar. 1980.
"Fibrous Carbon Rotor Aids Solvent Recovery" Compressed Air, Oil- and Moisture-Free, and a System . . .

Primary Examiner—Tom Wyse
Attorney, Agent, or Firm—Leydig, Voit & Mayer

[57] ABSTRACT

The disclosure describes an apparatus for sorbing one or more components from a fluid. The apparatus comprises a housing having an inlet, an outlet, and an exhaust and defining a fluid flow path between the inlet, outlet, and exhaust; partitioning structures which divide the housing into sorbing, regenerating, and cooling regions; a hollow sorbent-containing structure mounted for circulation within the housing in the fluid flow path and including sorbing, regenerating, and cooling sectors respectively defined by the sorbing, regenerating, and cooling regions in the housing; a mechanism for circulating the sorbent-containing structure through the sorbing, regenerating, and cooling regions, respectively; a heater disposed within the housing in the fluid flow path between the cooling and regenerating sectors of the sorbent-containing structure; first means for directing fluid from the inlet radially through the sorbing sector to the outlet; and second means for directing a portion of the fluid radially through the cooling sector, past the heater, radially through the regenerating sector, and out the exhaust.

17 Claims, 3 Drawing Figures

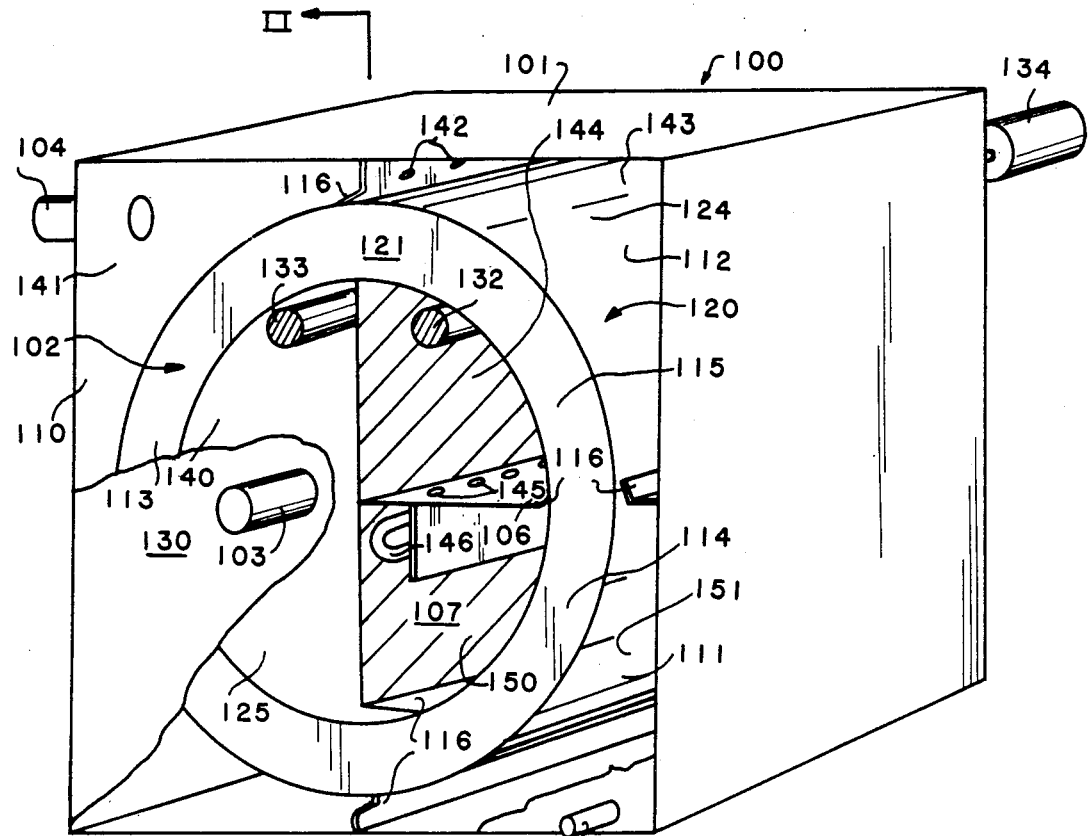
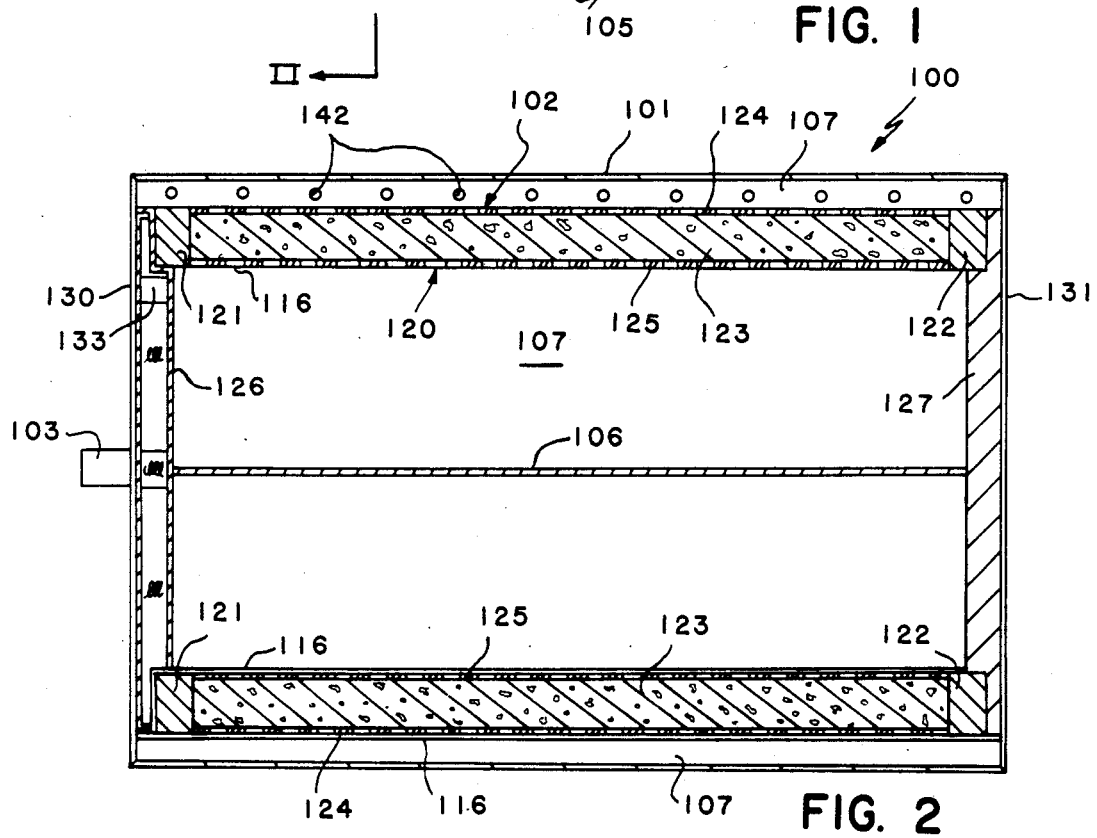

4,650,575

SORBING APPARATUS

TECHNICAL FIELD

The present invention relates to an apparatus for sorbing one or more components from a fluid. In particular, it relates to a sorbing apparatus which may be regenerated.

DISCLOSURE OF THE INVENTION

In many situations it is desirable to remove one or more components from a fluid, i.e., a gas or a liquid. For example, toxic chemical contaminants must be removed from water before it is drunk. Similarly, water vapor must be removed from compressed air before the compressed air is used to power mechanical equipment. Otherwise, the water vapor may condense, causing any metal components of the mechanical equipment to rust.

A general object of the present invention is to provide an improved apparatus for sorbing one or more components from a fluid. In accordance with the invention, the apparatus comprises a housing which has an inlet, an outlet, and an exhaust and defines a fluid flow path between them; partitions which are located within the housing and divide the housing into a sorbing region, a regenerating region, and a cooling region; a hollow structure containing a sorbent material, i.e., a material that absorbs or adsorbs one or more components from the fluid, which is mounted for circulation within the housing in the fluid flow path and includes a sorbing sector, a regenerating sector, and a cooling sector respectively defined by the sorbing region, regenerating region, and cooling region of the housing; a mechanism such as a motor which circulates the sorbent-containing structure through the sorbing, regenerating, and cooling regions respectively; a heater which is disposed within the housing in the fluid flow path between the cooling sector and the regenerating sector of the sorbent-containing structure; a first assemblage which directs the fluid from the inlet radially through the sorbing sector of the sorbent-containing structure, where one or more components are sorbed from the fluid, to the outlet; and a second assemblage which directs a portion of the fluid radially through the cooling sector of the sorbent-containing structure, thereby cooling that sector of the sorbent-containing structure, past the heater, thereby heating that portion of the fluid, radially through the regenerating sector of the sorbent-containing structure, thereby regenerating, and heating, that section of the sorbent-containing structure, and out the exhaust.

BRIEF DESCRIPTION OF THE DRAWINGS

In the accompanying drawings,

FIG. 1 is a perspective view of a first exemplary sorbing apparatus embodying the present invention shown with the front wall partially cut away.

FIG. 2 is a sectional view of the first exemplary sorbing apparatus of FIG. 1 as viewed along lines II.

BEST MODE FOR CARRYING OUT THE INVENTION

Figure 3:
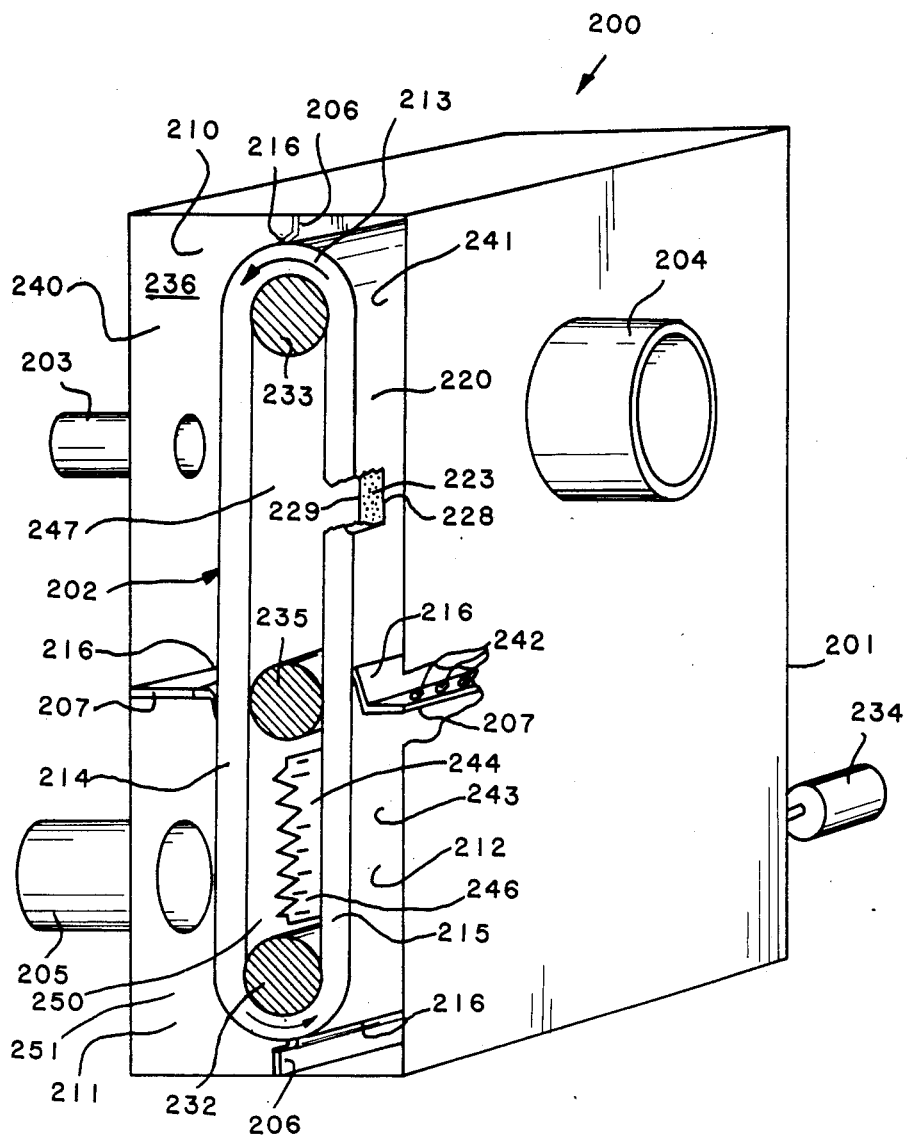
FIG. 3 is a perspective view of a second exemplary sorbing apparatus embodying the present invention shown without the front wall.

As shown in FIGS. 1 and 2, a first exemplary sorbing apparatus 100 constructed and operated in accordance with the invention generally comprises a housing 101 and a hollow, cylindrical sorbent arrangement 102. The housing 101 defines a fluid flow path between an inlet 103, an outlet 104 and an exhaust 105. The sorbent arrangement 102 includes a sorbent material and is mounted for rotation within the housing 101 in the fluid flow path. In accordance with one aspect of the invention, as the sorbent arrangement 102 rotates within the housing 101, fluid is directed generally radially through the sorbent arrangement 102 and each segment of the sorbent arrangement 102 first sorbs at least one component from the fluid, then is regenerated by a heated portion of the fluid, and then is cooled by that portion of the fluid prior to heating.

The housing 101 may be fabricated from any sufficiently rigid, impervious material and may be fashioned in any suitable configuration, depending on the parameters of a particular application. For example, for a high velocity flow of a high pressure fluid, the housing may, preferably, be fabricated from a heavy gauge metal to withstand the pressure and fashioned in a cylindrical configuration to minimize turbulence. The housing 101 of the first exemplary sorbing apparatus 100 accommodates a low velocity flow of a low pressure fluid and is preferably fabricated from thin metal sheet and fashioned in a boxlike configuration.

The housing 101 includes horizontal and vertical partitions 106, 107 which divide the housing into a sorbing region 110, a regenerating region 111, and a cooling region 112. The horizontal and vertical partitions 106, 107, which are joined along the axis of the cylindrical sorbent arrangement 102, similarly divide the sorbent arrangement 102 into a sorbing sector 113, a regenerating sector 114, and a cooling sector 115. In the first exemplary sorbing apparatus 100, the sorbent arrangement 102 passes through the horizontal partition 106 at one location and through the vertical partition 107 at two locations. To minimize the leakage of fluids between regions 110, 111, 112, each partition 106, 107 is fitted with seals 116 along the edges of the partition 106, 107 adjacent the rotating sorbent arrangement 102. While a variety of seals are suitable, a preferred seal 116 may comprise a blade fashioned from an elastomeric material, such as silicon rubber, removably mounted to the edge of the partition 106, 107. The blade extends circumferentially from the partition 106, 107 along the surface of the sorbent arrangement 102 in the direction of rotation.

The cylindrical sorbent arrangement 102 generally comprises a self-supporting sorbent assembly 120 joined between front and rear impervious end caps 121, 122. The sorbent assembly 120 includes a hollow, cylindrical bed 123 of sorbent material disposed between an outer perforated cage 124 and an inner perforated core 125. The cage 124 and core 125, which support the sorbent bed 123, may be fabricated from any sufficiently rigid material chemically compatible with the fluid, including any of several metals or polymers. The cage 124 and core 125 of the first exemplary sorbing apparatus 100 are preferably fabricated from stainless or carbon steel or from polytetrafluoroethylene (PTFE).

The sorbent bed 123 preferably comprises a microfibrous mass impregnated with particles of sorbent material. One example of such a microfibrous mass is described in copending Pall et al, U.S. patent application Ser. No. 568,824, and is available under the trademark PROFILE from Pall Corporation. As described in that application, the microfibrous mass comprises a mass of nonwoven, synthetic polymeric microfibers free of fiber-to-fiber bonding and maintained by mechanical entanglement or intertwining of the microfibers and may be impregnated with various sorbent materials. The particular synthetic polymer comprising the microfibrous mass of the sorbent bed 123 depends principally on the regeneration temperature. For example, for regeneration temperatures up to about 300 degrees Fahrenheit, the sorbent bed 123 may comprise a mass of polypropylene microfibers. For regeneration temperatures up to about 350 degrees Fahrenheit, the sorbent bed 123 may comprise a mass of polyester or Nylon 66 microfibers. The particular sorbent material incorporated in the microfibrous mass of the sorbent bed 123 depends on the particular application of the sorbing apparatus 100. For example, if the sorbing apparatus 100 is intended to remove a broad spectrum of toxic chemical contaminants from air, the sorbent bed 123 may contain particles of activated carbon. On the other hand, if the sorbing apparatus 100 is intended to remove water vapor from air, the sorbent bed 123 may contain particles of activated alumina or molecular sieve. In certain circumstances, it may even be advantageous to incorporate a mixture of sorbent materials in the sorbent bed 123. For example, if the sorbing apparatus 100 is intended to remove contaminants from water, the sorbent bed 123 may contain a mixture of activated carbon particles and particles of molecular sieve.

While the preferred embodiment of the sorbent bed 123 comprises a mass of synthetic polymeric microfibers impregnated with sorbent particles, any appropriately configured sorbent bed including a suitable sorbent material may be used. For example, the sorbent bed may comprise a mass of glass fibers impregnated with sorbent particles. Glass fibers can withstand regeneration temperatures up to about 600 degrees Fahrenheit. The sorbent bed 123 may also comprise a bed of compressively-loaded loose sorbent particles contained between fines filters.

Alternatively, the sorbent bed may comprise a self-supporting structure as described in copending Degen and Gsell, U.S. patent application Ser. No. 603,699 or copending Degen and Gsell U.S. patent application Ser. No. 640,447. As described in U.S. Ser. No. 603,699, a self-supporting structure of immobilized carbon particles may be formed by mixing activated carbon particles and a polymeric binding material such as powdered polyethylene. The mixture is heated to about 50 to 90 degrees F above the Vicat softening point, and the heated mixture is then compressed for 1 to 5 minutes at 0.3 to about 10 psi. As described in U.S. Ser. No. 640,447, a self-supporting structure of immobilized inorganic sorbent particles may be formed by heating sorbent particles, such as activated alumina, to about 270 degrees Fahrenheit, blending a polymeric binder, such as polyethylene powder, with fumed silica, and mixing the pre-heated sorbent particles with the polymeric binder and fumed silica. After the mixture cools to about 70 degrees Fahrenheit, it is transferred to a mold, heated for one hour at about the solid-liquid transition temperature of the polyethylene, e.g., about 260 degrees Fahrenheit, and then compressed for about one minute at about 0.3 to about 10 psi.

The impervious, annular end caps 121, 122 are joined to the ends of the sorbent assembly 120 and serve to direct fluid generally radially through the sorbent assembly 120 and to support the sorbent assembly 120 both axially and radially. The end caps 121, 122 are mounted to the housing 101 in any suitable manner which both supports the sorbent arrangement 102 for rotation and prevents bypass of the fluid around the sorbent bed 123. For example, the front and rear end caps 121, 122 may engage front and rear mounting brackets 126, 127 stationarily mounted to the front and rear walls 130, 131 of the housing 101, respectively. A hub portion of each mounting bracket 126, 127 has a diameter corresponding to the inside diameter of each end cap 121, 122 and projects axially a short distance into the center of the end cap 121, 122 to radially support the sorbent arrangement 102. To axially maintain the sorbent arrangement 102 in position, the front mounting bracket 126 may be spring-mounted to the front wall 130, biasing the sorbent arrangement 102 against the rear mounting bracket 127. The end caps 121, 122 slide over the mounting brackets 126, 127 as the sorbent arrangement 102 rotates. Consequently, both the end caps 121, 122 and the mounting brackets 126, 127 are preferably fabricated from materials which slide smoothly across one another with little wear. In the illustrated apparatus 100, both the end caps 121, 122 and the mounting brackets 126, 127 may be fabricated from PTFE.

The sorbent arrangement 102 is also supported by first and second rollers 132, 133 disposed on opposite sides of the vertical partition 107, frictionally engaging the inside of the sorbent arrangement 102. The rollers 132 project through apertures in the hub portions of the mounting brackets 126, 127 and are supported by bearings mounted in the front and rear walls 130, 131 of the housing 101. At least one of the rollers 132 is driven by a motor 134 through a gland in the rear wall 131. The driven roller 132 in turn rotates the sorbent arrangement 102. Alternatively, the motor 134 may be disposed within the housing 101 or may be mechanically coupled to the sorbent arrangement 102 by a belt, chain, or gear drive.

In a preferred mode of operation, the motor 134 circulates the hollow, cylindrical sorbent arrangement 102 through the sorbing, regenerating, and cooling regions 110, 111, 112, respectively, i.e., counterclockwise in FIG. 1. A blower (not shown), preferably disposed upstream from the inlet 103, forces fluid through the inlet 103 in the front wall 130 of the housing 101 into an inlet chamber 140 in the sorbing region 110 of the housing 101. A particulate filter (not shown) may also be located upstream from the inlet 103 to remove particulates from the fluid before it enters the inlet chamber 140. In the first exemplary sorbing apparatus 100, the inlet chamber 140 is located in the interior of the hollow, cylindrical sorbent arrangement 102. Alternatively, it may be located adjacent the exterior of the sorbent arrangement 102, as will be shown with reference to the second exemplary sorbing apparatus 200 of FIG. 3.

From the inlet chamber 140 the fluid passes generally radially, i.e., generally perpendicularly to the axis of rotation of filter arrangement 102, through the sorbing sector 113 of the rotating sorbent arrangement 102 and into an outlet chamber 141 in the sorbing region 110 of the housing 101. The hollow configuration of the sorbent arrangement 102 and the radial direction of flow greatly facilitate the sealing of the sorbent arrangement 102 against bypass compared to many conventional axial flow devices. As the fluid passes through the sorbent assembly 120, one or more components are sorbed from the fluid by the sorbent bed 123. For example, if the sorbing apparatus 100 is used as a dryer for compressed air, the sorbent bed 123 may contain activated alumina which sorbs water vapor from the compressed air, passing dry compressed air into the outlet chamber 141. Alternatively, if the sorbing apparatus 100 is used as an air purifier, the sorbent bed 123 may contain activated carbon which sorbs toxic chemical contaminants from the air, passing purified air into the outlet chamber 141.

From the outlet chamber 141, most of the fluid exits the housing 101 through the outlet 104. However, a small portion of the fluid passes through apertures 142 in the vertical partition 107 into a cool fluid chamber 143 in the cooling region 112 of the housing 101. Since the sorbent arrangement 102 rotates counterclockwise, as the sorbent bed 123 rotates into the cooling region 112 of the housing 101 from the regenerating region 111 where it was heated during regeneration, the bed 123 is hot but largely free of sorbed components. In accordance with another aspect of the invention, the relatively cool fluid in the cool fluid chamber 143 passes generally radially through the cooling sector 115 of the sorbent arrangement 102, cooling the sorbent bed 123 and purging any residual sorbed components from the bed 123. The cool, regenerated sorbent bed 123 then rotates into the sorbing region 110 of the housing 101 where it again sorbs components from fluid passing through the sorbing sector 113 of the sorbent arrangement 102.

Meanwhile, fluid passing from the cool fluid chamber 143 through the cooling sector 115 is warmed by the hot sorbent bed 123. Consequently, the fluid reclaims a portion of the heat provided for regeneration which thereby reduces energy costs. The fluid then enters a warm fluid chamber 144 in the cooling region 112 of the housing 101. From the warm fluid chamber 144, the fluid passes through apertures 145 in the horizontal partition 106, past a heater 146, and into a hot fluid chamber 150. The heater 146, which heats the fluid to the desired regeneration temperature, may comprise any suitable heat source, including an electrical resistance heater or a heat exchanger. Further, it may include a temperature control mechanism such as a cutoff switch or a thermostat for maintaining the temperature of the fluid in the hot fluid chamber 150 within a desired range.

From the hot fluid chamber 150, the heated fluid passes generally radially through the regenerating sector 114 of the sorbent arrangement 102 into an exhaust chamber 151. As the sorbent bed 123 rotates into the regenerating region 111 of the housing 101 from the sorbing region 110, it is charged with the components sorbed from the fluid. The heated fluid passing through the regenerating sector 114 desorbs these components from the sorbent bed 123, regenerating and heating the bed 123. The sorbent bed 123 then rotates into the cooling region 112 of the housing 101 where it is cooled while the fluid, now highly concentrated with the desorbed components, passes from the exhaust chamber 151 through the exhaust 105.

As shown in FIG. 3, a second exemplary sorbing apparatus 200 constructed and operated in accordance with the invention generally comprises a housing 201 and a hollow, flexible belt sorbent arrangement 202. (Corresponding elements of the first and second sorbing apparatus 100, 200 are identified by reference numerals having the same last two digits.) The housing 201 is similar to the housing 101 of the first sorbing apparatus 100 but may be smaller since the flexible belt sorbent arrangement 202 may be more compactly configured than the cylindrical sorbent arrangement 102. Horizontal and vertical partitions 206, 207 similarly divide the housing 201 into sorbing, regenerating, and cooling regions 210, 211, 212 and divide the sorbent arrangement 202 into sorbing, regenerating, and cooling sectors 213, 214, 215. In addition to the seals 216 mounted to the horizontal and vertical partitions 206, 207, the housing 201 may include seals which extend along the edges of the flexible belt sorbent arrangement 202 to prevent fluid bypass.

The flexible belt sorbent arrangement 202 generally comprises a flexible sorbent assembly 220 which is fashioned as a continuous belt and includes a sorbent bed 223. The sorbent bed 223 is preferably fashioned from a flexible microfibrous mass similar to those described for the sorbent bed 123 of the first exemplary sorbing apparatus 100. The microfibrous mass is impregnated with sorbent particles, the particular type of sorbent particles depending on the parameters of a particular application. To prevent fraying of the microfibrous mass and to provide additional structural integrity, the sorbent assembly 220 may also include a porous, flexible support layer 228, 229, e.g., a sheet of woven polymeric fibers, joined to each face of the sorbent bed 223. The sorbent layers 228, 229 may be joined along the edges of the sorbent assembly 220 to provide even greater strength.

The sorbent arrangement 202 is mounted about first and second rollers 232, 233 which, in turn, are supported by bearings mounted in the front and rear walls 230, 231 of a housing 201. At least one of the rollers 232 is driven by a motor 234, for example, through a gland in the rear wall 231. The driven roller 232, in turn, circulates the flexible belt sorbent arrangement 202. A third roller 235 mounted between the front and rear walls 230, 231 in the plane of the horizontal partition 206 serves to maintain separation between the vertical portions of the flexible belt sorbent arrangement 202 and to partition the interior of the flexible belt sorbent arrangement 202 into two portions.

The preferred mode of operation of the second exemplary sorbing apparatus 200 is very similar to that of the first exemplary sorbing apparatus 100. The motor 234 circulates the flexible belt sorbent arrangement 202 through the sorbing, regenerating, and cooling regions 210, 211, 212, respectively, i.e., counterclockwise in FIG. 3. A blower (not shown) forces fluid through the inlet 203 into an inlet chamber 240 in the sorbing region 210 of the housing 201. In the second exemplary sorbing apparatus 200, the inlet 203 is located in a side wall 236 of the housing 201 and the inlet chamber 240 is located adjacent the exterior of the flexible belt sorbent arrangement 202. Alternatively, the inlet chamber 240 may be located in the interior of the sorbent arrangement 202 as in the first exemplary sorbing apparatus 100. From the inlet chamber 240, the fluid passes generally radially, i.e., generally perpendicularly to the axes of rotation of the rollers 232, 233, 235, through the sorbing sector 213 of the circulating sorbent arrangement 202 into an intermediate chamber 247. The fluid then again passes generally radially through the sorbing sector 213 of the sorbent arrangement 202 into an outlet chamber 241. From the outlet chamber 241, most of the fluid exits the housing 201 through the outlet 204. Thus, a principal advantage of having the inlet chamber 240 adjacent the exterior of the sorbent arrangement 202 is that the fluid passes through the sorbent bed 223 twice before exiting the sorbing apparatus 200 through the outlet 204.

In a manner analagous to that of the first exemplary sorbing apparatus 100, a small portion of the fluid passes from the cooling chamber 241 through apertures 242 in the horizontal partition 206 into a cool fluid chamber 243 in the cooling region 212 of the housing 201. The fluid in the cool fluid chamber 243 then passes generally radially through the cooling sector 215 of the sorbent arrangement 202, cooling the sorbent bed 223, and then enters a warm fluid chamber 244. From the warm fluid chamber 244, the fluid passes a heater 246, enters a hot fluid chamber 250, and then passes generally radially through the regenerating sector 214 of the sorbent arrangement 202, regenerating the sorbent bed 223. The fluid then passes into the exhaust chamber 251 and exits the sorbing apparatus 200 through the exhaust 205.

Although the invention has been described in terms of two exemplary embodiments, it is not limited to those embodiments. Alternative embodiments and modifications which would still be encompassed by the invention may be made by those skilled in the art, particularly in light of the foregoing teachings. Therefore, the following claims are intended to cover any alternative embodiments, modifications or equivalents which may be included within the spirit and scope of the invention as defined by the claims.

I claim:

1. An apparatus for sorbing one or more components from a fluid, said apparatus comprising a housing having an inlet, an outlet, and an exhaust and defining a fluid flow path therebetween, means disposed within the housing for partitioning the housing into sorbing, regenerating, and cooling regions, a hollow, sorbent-containing structure mounted for circulation within the housing in the fluid flow path, said sorbent-containing structure including sorbing, regenerating, and cooling sectors respectively defined by the sorbing, regenerating, and cooling regions of the housing, means for circulating the sorbent-containing structure through the sorbing, regenerating, and cooling regions, respectively, a heater disposed within the housing in the fluid flow path between the cooling and regenerating sectors of the sorbent-containing structure, first means for directing fluid from the inlet radially through the sorbing sector to the outlet, and second means for directing a portion of the fluid radially through the cooling sector, past the heater, radially through the regenerating sector, to the exhaust.

2. The sorbing apparatus of claim 1 wherein the sorbing region includes an inlet chamber communicating directly with the inlet, said inlet chamber being disposed within the interior of the hollow sorbent-containing structure.

3. The sorbing apparatus of claim 1 wherein the sorbing region includes an inlet chamber, an intermediate chamber, and an outlet chamber, said inlet chamber communicating directly with the inlet and lying adjacent the exterior of the hollow sorbent-containing structure, and wherein said first means includes means for directing the fluid from the inlet chamber radially through the sorbing sector to the intermediate chamber and from the intermediate chamber radially through the sorbing sector to the outlet chamber.

4. The sorbing apparatus of claim 1 wherein the sorbing region includes an outlet chamber communicating directly with the outlet and wherein the second means includes apertures in the partitioning means for drawing the portion of the fluid from the outlet chamber.

5. The sorbing apparatus of claim 1 wherein the circulating means includes at least one roller engaging the sorbent-containing structure and a motor operatively associated with the roller to rotate the roller.

6. The sorbing apparatus of claim 1 wherein the sorbent-containing structure includes a sorbent bed comprising a fibrous mass impregnated with sorbent particles.

7. An apparatus for sorbing one or more components from a fluid, said apparatus comprising a housing having an inlet, an outlet, and an exhaust and defining a fluid flow path therebetween, partitions disposed within the housing for dividing the housing into sorbing, regenerating, and cooling regions, a hollow, cylindrical sorbent-containing structure mounted for rotation within the housing in the fluid flow path, said sorbent-containing structure including sorbing, regenerating, and cooling sectors respectively defined by the sorbing, regenerating, and cooling regions of the housing, means for rotating the sorbent containing structure through the sorbing, regenerating, and cooling regions, respectively, a heater disposed within the housing in the fluid flow path between the cooling and regenerating sectors of the sorbent-containing structure, first means for directing fluid from the inlet radially through the sorbing sector to the outlet and second means for directing a portion of the fluid radially through the cooling sector, past the heater, radially through the regenerating sector, and out the exhaust.

8. The sorbing apparatus of claim 7 wherein the sorbing region includes an inlet chamber communicating directly with the inlet and disposed within the interior of the cylindrical sorbent-containing structure.

9. The sorbing apparatus of claim 7 wherein the sorbing region includes an outlet chamber communicating directly with the outlet and wherein the second directing means includes apertures in the partitions for drawing the portion of fluid from the outlet chamber.

10. The sorbing apparatus of claim 7 wherein the circulating means includes at least one roller frictionally engaging the cylindrical sorbent-containing structure and a motor operatively associated with the roller for rotating the roller.

11. The sorbing apparatus of claim 1 wherein the housing further includes means for spring-mounting the sorbent-containing structure to the housing.

12. The sorbing apparatus of claim 7 wherein the sorbent-containing structure includes a sorbent bed comprising a microfibrous mass impregnated with sorbent particles.

13. The sorbing apparatus of claim 7 wherein the sorbent-containing structure includes a sorbent bed comprising a mixture of particles of a polymeric binding material and sorbent particles.

14. An apparatus for sorbing one or more components from a fluid, said apparatus comprising a housing having an inlet, an outlet, and an exhaust and defining a fluid flow path therebetween, means disposed within the housing for partitioning the housing into sorbing, regenerating, and cooling regions, a flexible belt sorbent-containing structure mounted for circulation within the housing in the fluid flow path, said sorbent-containing structure including sorbing, regenerating, and cooling sectors respectively defined by the sorbing, regenerating, and cooling regions of the housing, at least one roller disposed within the housing and frictionally engaging the flexible belt sorbent-containing structure, a motor operatively associated with the roller for circulating the sorbent-containing structure through the sorbing, regenerating, and cooling regions, respectively, a heater disposed within the housing in the fluid flow path between the cooling and regenerating sectors of the sorbent-containing structure, first means for directing fluid from the inlet radially through the sorbing sector to the outlet and second means for directing a portion of the fluid radially through the cooling sector, past the heater, radially through the regenerating sector, and out the exhaust.

15. The sorbing apparatus of claim 14 wherein the sorbing region includes an inlet chamber, an intermediate chamber, and an outlet chamber, said inlet chamber communicating directly with the inlet and lying adjacent the exterior of the flexible belt sorbent-containing structure, and wherein the first directing means includes means for directing the fluid from the inlet chamber radially through the sorbing sector to the intermediate chamber and from the intermediate chamber radially through the sorbing sector to the outlet chamber.

16. The sorbing apparatus of claim 14 wherein the sorbing region includes an outlet chamber communicating directly with the outlet and wherein the second directing means includes apertures in the partitioning means which allow the portion of the fluid to pass from the outlet chamber into the cooling region.

17. The sorbing apparatus of claim 14 wherein the flexible belt sorbent-containing structure includes a sorbent bed comprising a fibrous mass impregnated with sorbent particles.

* * * * *